United States Patent [19]
Janik et al.

[11] Patent Number: 5,985,144
[45] Date of Patent: Nov. 16, 1999

[54] REVERSE FLOW CARTRIDGE

[75] Inventors: Leon P. Janik, Suffield; Michael J. Williams, Glastonbury; Larry R. Cote, Coventry, all of Conn.

[73] Assignee: Stanadyne Automotive Corp., Windsor, Conn.

[21] Appl. No.: 08/888,222

[22] Filed: Jul. 3, 1997

[51] Int. Cl.$^6$ .................................................. B01D 35/00
[52] U.S. Cl. .......................... 210/233; 210/438; 210/440; 210/455; 210/456
[58] Field of Search ................................ 210/233, 435, 210/438, 443, 444, 455, 456, 493.2, 439, 440

[56] References Cited

U.S. PATENT DOCUMENTS

| | | | |
|---|---|---|---|
| 2,639,036 | 5/1953 | Humber et al. | 210/233 |
| 3,076,550 | 2/1963 | Wilhelm | 210/443 |
| 5,236,579 | 8/1993 | Janik et al. | 210/438 |

*Primary Examiner*—Matthew O. Savage
*Attorney, Agent, or Firm*—Alix, Yale & Ristas, LLP

[57] ABSTRACT

An improved fuel filter cartridge comprises a housing which defines an opening, a filter element enclosed within the housing, and a flow-reversing insert disposed within the housing between the opening and the filter element. The improved filter cartridge is preferably used with a conventional header of the type having a fuel entry port, a fuel exit port, a central first conduit for interiorly defining a first axial fuel passage which is in fluid communication with the entry port of the header. Headers used with the improved filter cartridge also include a second conduit surrounding and cooperating with the first conduit to define a second axial fuel passage therebetween, the second fuel passage being in fluid communication with the exit port of the header, and a base for mounting the filter cartridge thereto. When the filter cartridge is mounted to the base of the header, the insert, filter element and housing cooperate to define a first chamber in communication with the first conduit of the header and to define a second chamber in communication with the second conduit of the header. Fuel delivered to the exit port of the header progressively flows through the second conduit, is guided radially outwardly by the insert, flows through the filter element, flows through the first conduit and, finally, flows into the entry port of the header. Methods of using the improved filter cartridge are also disclosed.

10 Claims, 4 Drawing Sheets

REVERSE FLOW CARTRIDGE

BACKGROUND OF THE INVENTION (1) Field of the Invention

The present invention generally relates to enhancements in devices for filtering and separating liquids. More particularly, the present invention relates to fuel filters for removing foreign particles and separating water from fuel of a fuel supply system associated with an internal combustion engine. Accordingly, the general objects of the present invention are to provide novel and improved methods and apparatus of such character.

(2) Description of the Related Art

Diesel fuel supplies frequently contain significant quantities of abrasive particles and/or water which present the potential for permanent damage to the components of the fuel injection pump and the fuel delivery system of the engine. Consequently, an effective fuel filter assembly is a practical necessity and is conventionally incorporated into the fuel supply system of a diesel engine. A multitude of conventional fuel filter assemblies employ a disposable filter cartridge which is replaced at pre-established intervals of filter usage. Such filter cartridges typically perform the dual function of removing particulate material from the diesel fuel and separating water from the fuel.

The fuel filter assemblies to which the present invention relates include a replaceable filter cartridge and a header with a base which accepts the disposable filter cartridge. The filter cartridge has a housing which defines an axial opening at one end thereof to provide fuel communication between the fuel delivery system and a filter element disposed within the cartridge housing. A sealing grommet is disposed at the axial opening to provide a fluid-tight seal. The fuel filter cartridges may house a single stage filter or a dual stage filter and may assume a wide variety of shapes and configurations.

Conventional headers used with such fuel filter assemblies include a fuel entry port which is in fluid communication with a central axial fuel conduit for transporting fuel to be filtered into the filter cartridge. Additionally, a fuel exit port of the header is fluidly connected to a coaxial fuel conduit disposed about the central fuel conduit and cooperating therewith to define a fuel exit passage therebetween. Thus, fuel to be filtered conventionally enters the filter cartridge via the central fuel conduit, is filtered therein and then exits the filter cartridge via the exit fuel passage which surrounds the central fuel conduit.

In such conventional fuel filter assemblies, a manual primer mechanism is often provided to facilitate engine starting after a spent fuel cartridge has been replaced with a fresh one. In particular, this fuel primer mechanism is disposed in the fuel flow path between the fuel entry port and the central fuel conduit such that actuation of the manual primer pump draws fuel from the connected fuel supply and forces it into the filter cartridge. While such designs can effectively prime the filter cartridge, they suffer from the deficiency that the fuel passing through the primer mechanism has not yet been filtered by the filter cartridge. Thus, the contaminated fuel passing therethrough can deposit particulate matter on the manual primer mechanism or other pump devices. These particles accumulate over time and interfere with proper performance of the primer mechanism. Naturally, this problem becomes more acute as the field life of the fuel filter assembly increases. Failure of the fuel filter assembly may be the result of this situation. This deficiency is particularly acute in fuel filter assemblies used on heavy construction equipment, such as bulldozers and cranes, due to the severe environmental conditions in which such equipment normally operates. However, the deficiency may be of concern in virtually every application.

It has been discovered that the above-described deficiency could be alleviated by reconfiguring the fuel filter assembly so that the manual primer pump is located downstream of the filter cartridge. Since, with such an arrangement, the fuel passing through the primer mechanism has already passed through the filter cartridge, very few, if any, contaminants have an opportunity to accumulate in the primer mechanism. The above-described deficiencies of conventional fuel filter assemblies can, thus, conceivably be overcome by replacing all such filter assemblies with newly redesigned devices. Such a solution is, however, highly impractical unless it could be accomplished in an efficient and cost effective manner. Moreover, the reversal of the flow path within the filter cartridge is far from straightforward because of the significant constraints of optimum space utilization in the context of providing sufficient effective filter media area.

Accordingly, there is a need in the art for improved fuel filter assemblies and methods therefor in which fuel entering the fuel filter assembly is filtered substantially immediately upon entry into the fuel filter assembly. There is a further need in the art for inexpensive fuel filter assemblies and methods therefor to retrofit conventional fuel supply systems with improved fuel filter assemblies.

SUMMARY OF THE INVENTION

Briefly stated, the invention in one embodiment is an improved fuel filter cartridge for use with a header of a conventional fuel filter assembly. The cartridge comprises a housing which defines an opening and a filter element is enclosed within the housing. A flow-reversing insert is disposed within the housing between the opening thereof and the filter element. The improved filter cartridge of the present invention is preferably used with a header of the type having a fuel entry port, a fuel exit port, a central first conduit for interiorly defining the first axial fuel passage which is in fluid communication with the entry port of the header. Headers used with the instant invention also include a second conduit surrounding and cooperating with the first conduit to define a second axial fuel passage therebetween, the second fuel passage being in fluid communication with the exit port of the header, and a base for mounting the improved filter cartridge to the header.

When the inventive filter cartridge is used with a conventional header, the fuel flow through the header is reversed (e.g., fuel is delivered to the header via the exit port and is removed therefrom via the entry port). In the fuel filter cartridge of the present invention, the insert, filter element and housing cooperate to define a first chamber in communication with the first conduit of the header and to define a second chamber in communication with the second conduit of the header. When the filter cartridge is mounted to the base of the header, the cartridge chambers cooperate with the header conduits such that fuel delivered to the exit port of the header progressively flows through the second conduit, is guided radially outwardly by the insert, flows through the filter element, flows through the first conduit and, finally, flows into the entry port of the header.

The above-described configuration of the filter cartridge of the present invention provides effective filtration of fuel passing through a conventional header in a direction which is opposite to the normal direction of fuel flow through the header. Thus, fuel filter cartridges in accordance with the present invention allow previously purchased and currently used headers to be connected and operated in a reverse direction and in a reverse manner relative to prior usage of such headers. In fuel filter assemblies employing manual primer mechanisms, the instant invention thus protects the primer mechanism or pump by ensuring that the fuel passing through the newly converted fuel filter assembly is filtered prior to passing by the primer mechanism.

The method and apparatus of the present invention provides significant advantages over and relative to the above-discussed related art. For example, by using the methods and apparatus of the instant invention, conventional fuel filter headers previously sold and currently in operation can be quickly and inexpensively converted into a more reliable and efficient configuration. Numerous other advantages and features of the present invention will become apparent to those of ordinary skill in the art from the following detailed description of the invention, from the claims and from the accompanying drawings.

It is accordingly an object of the present invention to provide an improved fuel filter cartridge for use with conventional fuel filter assemblies in which fuel entering the fuel assembly is routed to the filter enclosed within the filter cartridge prior to communication with the manual primer mounted to the filter assembly header.

It is a further object of the present invention to provide inexpensive methods and apparatus for retrofitting conventional fuel supply systems associated with internal combustion engines with improved fuel filter assemblies.

It is still another object of the present invention to provide an improved fuel filter cartridge for use with conventional fuel filter assemblies which employ manual primers or header mounted pumps to improve the performance thereof.

BRIEF DESCRIPTION OF THE DRAWINGS

The preferred embodiments of the present invention will be described below with reference to the accompanying drawings wherein like numerals represent like structures and wherein:

FIG. 1b is a cross-sectional elevation view of the insert depicted in FIG. 1a, the section being taken along line b—b of FIG. 1a;

DESCRIPTION OF THE PREFERRED EMBODIMENTS

Figure 1A:
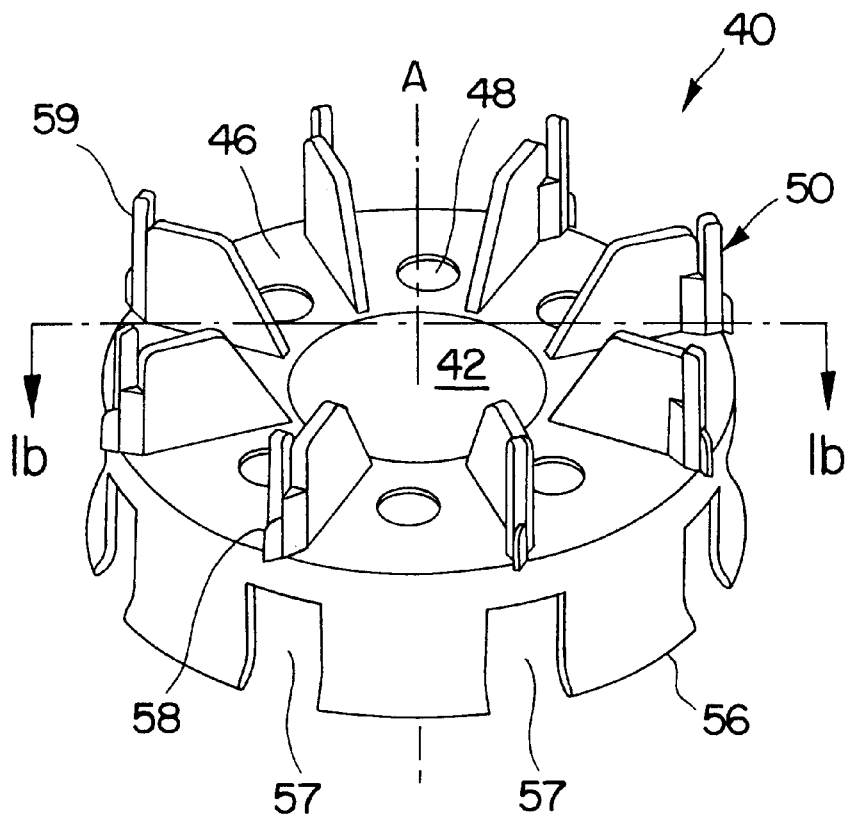
FIG. 1a is a perspective view of an insert used with a filter cartridge in accordance with one embodiment of the present invention.
Figure 1B:
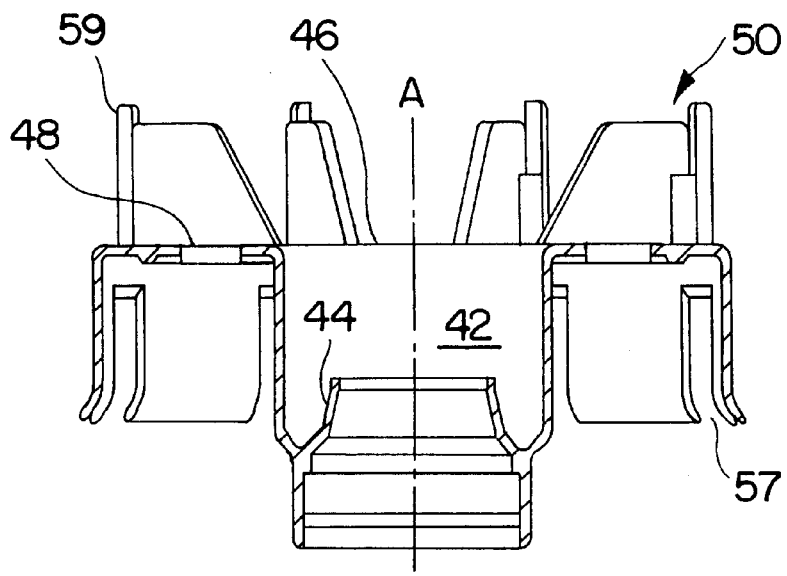

A first preferred embodiment of the filter cartridge according to the invention will be described below with joint reference to FIGS. 1a, FIG. 1b and FIG. 2. The inventive cartridge 12 depicted therein incorporates the present invention into an embodiment designed for use with a diesel engine. However, it will also be appreciated that the instant invention can be incorporated into a wide variety of other styles of known fluid filters for use in a wide range of environments and with other fluids.

Figure 2:
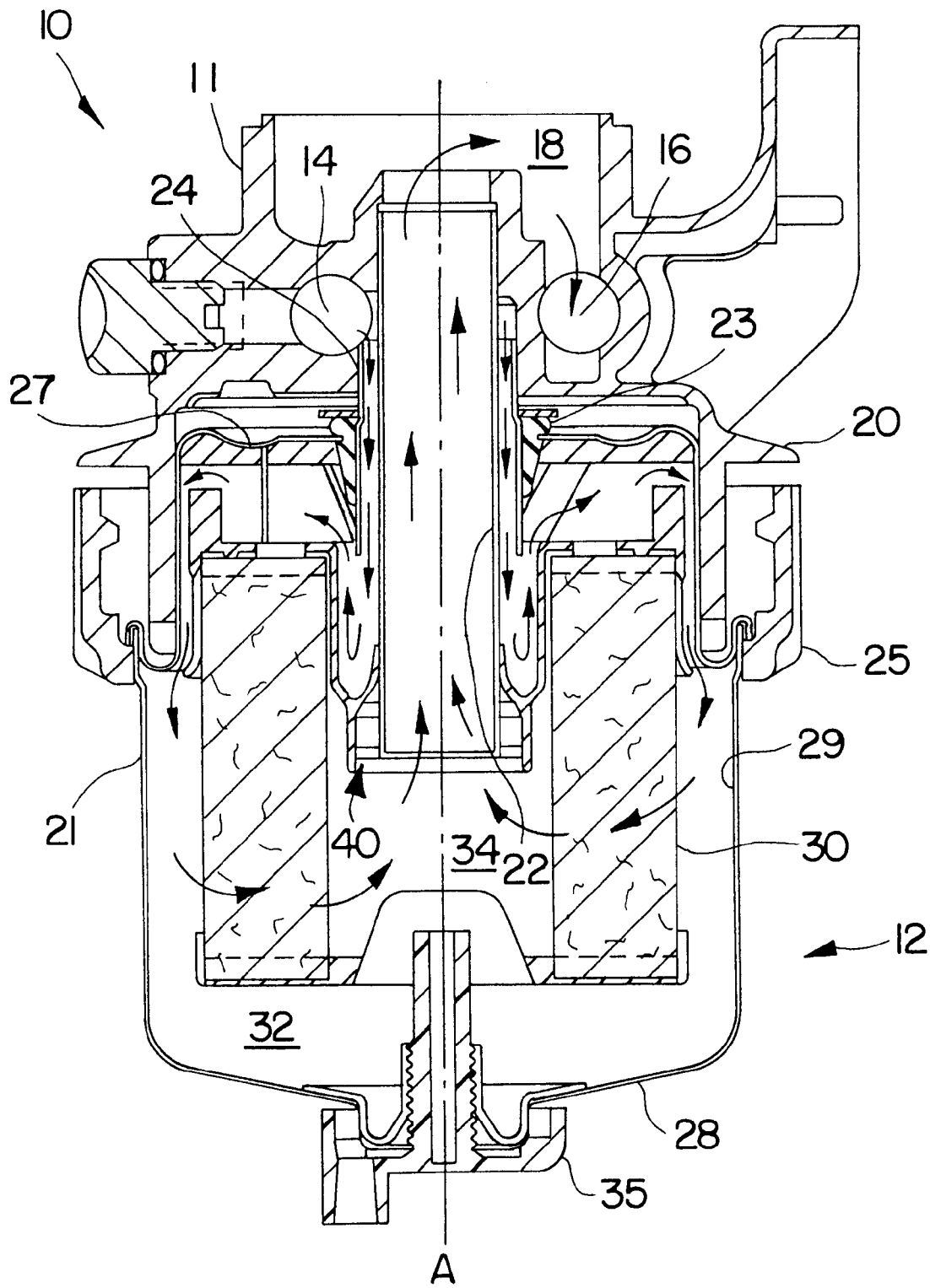
FIG. 2 is a cross-sectional elevation view of a filter cartridge in accordance with one embodiment of the present invention shown in combination with a header of the related art.

With reference to FIG. 2, a fuel filter cartridge 12 in accordance with one embodiment of the present invention can be mounted to a base 20 of a conventional header 10 via a retaining collar or ring 25 to form an improved fuel filter assembly. The header 10 comprises a body 11 which defines a fuel exit port 14, a fuel entry port 16, base 20 and a reservoir 18. Additionally, header 10 includes a first central fuel conduit 22, which is in fluid communication with reservoir 18 and fuel entry port 16, and a second fuel conduit 24 which is in fluid communication with fuel exit port 14. First and second conduits 22 and 24 are symmetric about an axis A. When header 10 is operated in the conventional manner, fuel entry port 16 acts as a fuel entry passage and fuel exit port 14 acts as a fuel exit passage. Thus, fuel to be filtered by the fuel assembly conventionally enters header 10 via fuel entry port 16, flows through reservoir 18 and enters a conventional filter cartridge via passage through first conduit 22. After conventional filtration occurs, the filtered fuel enters second conduit 24 and then exits the fuel assembly via fuel exit port 14. The cartridge 12 is disposable and is replaced upon sufficient degradation of its filter qualities.

While filter cartridge 12 of the present invention is used with conventional header 10, header 10 is operated in a reverse manner relative to the normal operation thereof. In particular, when header 10 is used in conjunction with the present invention, fuel exit port 14 serves as a fuel entry passage and fuel entry port 16 serves as a fuel exit passage. Consequently, second conduit 24 acts as a fuel entry conduit and first conduit 22 acts as a fuel exit conduit.

As shown in FIG. 2, filter cartridge 12 includes a housing 21, a filter element 30, a flow-reversing insert 40 and a water drain mechanism 35. Housing 21 is generally cylindrical in shape and includes a generally cylindrical side-wall 29 and opposing first and second end walls 27 and 28. First end wall 27 defines an opening having a grommet seal 23 disposed thereon for sealingly engaging the exterior of second conduit 24 when cartridge 12 and header 10 are engaged with one another. At an opposite end of housing 21, second end wall 28 defines an opening for receiving water drain mechanism 35 as is known in the art.

Filter 30 is a conventional filter element of a continuous fanshaped, pleated configuration symmetrically disposed about the axis A. Thus, as fuel flows through filter element 30, particulate matter and water suspended in the fuel are removed therefrom.

Cartridge 12 also includes insert 40. As best seen in FIGS. 1a and 1b, insert 40 includes a central region 42, a plateau 46 and a plurality of upstanding fins 50 and a notched skirt 56. Central region 42 includes a generally tubular wall which terminates in a central sealing lip 44 to thereby define an aperture extending therethrough. Lip 44 is preferably sized and shaped to sealingly engage the first conduit 22 of header 10 to thereby prevent direct fluid communication between first and second conduits 22 and 24. Plateau 46 is a generally annular and planar element extending from central region 42 toward the perimeter of insert 40. Dimples 48 define a plurality of structurally weakened regions periodically disposed about plateau 46. As noted below, dimples 48 can be punched out and define fuel passage apertures as desired. Notched skirt 56 is formed of a plurality of walls angularly disposed about the perimeter of insert 40. Thus, skirt 56 generally defines a discontinuous cylindrical wall with fuel notches 57 located therein. Skirt 56 also is configured with an outward quasiresilient flare at the bottom end thereof to ensure snug fit between insert 40 and housing 21.

Angularly spaced upstanding fins 50 are disposed on top of plateau 46 and are oriented in a radial direction. Accordingly, fins 50 serve to permit radially outward flow of fuel originating from central region 42. Detents 58 cooperate with the flared bottom end of skirt 56 to help ensure a snug fit between insert 40 and housing 21 as well as to ensure the presence of a continuous fuel passage from central region 42 through fuel notches 57. Thus, a fluid tight seal at the opening of filter cartridge 12 is virtually assured. Also as shown in FIG. 2, skirt 56 and central region 42 of insert 40 cooperate to fixedly receive one end of filter element 30 to maintain a fixed relationship therebetween.

As can be seen from FIG. 2, housing 21, insert 40 and filter element 30 cooperate to define first and second chambers 32 and 34. Due to the configuration of these components and as indicated by the FIG. 2 arrows, the fuel flow path within the inventive fuel assembly traverses from header 10, into first chamber 32, into second chamber 34 and back into header 10. Filtering and water coalescing ordinarily takes place as the fuel passes through filter element at the interface of first and second chambers 32 and 34.

Fluid flow through header 10 and cartridge 12 will now be described in greater detail with primary reference to FIG. 2 where the fuel flow is indicated with arrows. As noted above, the present invention utilizes reverse fluid flow through header 10. Thus, fuel delivered to header 10 arrives at exit port 14 (passage 14 serves as a fuel entry passage rather than a conventional fuel exit passage). This fuel then flows in an axial direction through the space defined between first and second conduits 22 and 24 and into first chamber 32. Fuel exiting second conduit 24 reverses axial direction due to the sealing engagement between lip 44 and conduit 22 and is guided radially outwardly over plateau 46 to side-wall 29 of housing 21. Fuel then flows through the fuel passage 57 and toward the second end wall 28 of housing 21. Thus, the fuel flows between filter element 30 and sidewall 29 of housing 21. The fuel then flows radially inwardly through filter element 30 and into second chamber 34 until it is radially inward of the fuel passage defined between first and second fuel conduits 22 and 24. This fuel then flows axially toward first end wall 27 of housing 21 through first conduit 22 and into reservoir 18. Finally, the fuel flows into fuel entry port 16 and exits header 10 therefrom (i.e., fuel entry port 16 acts as the fuel exit passage).

Figure 3:
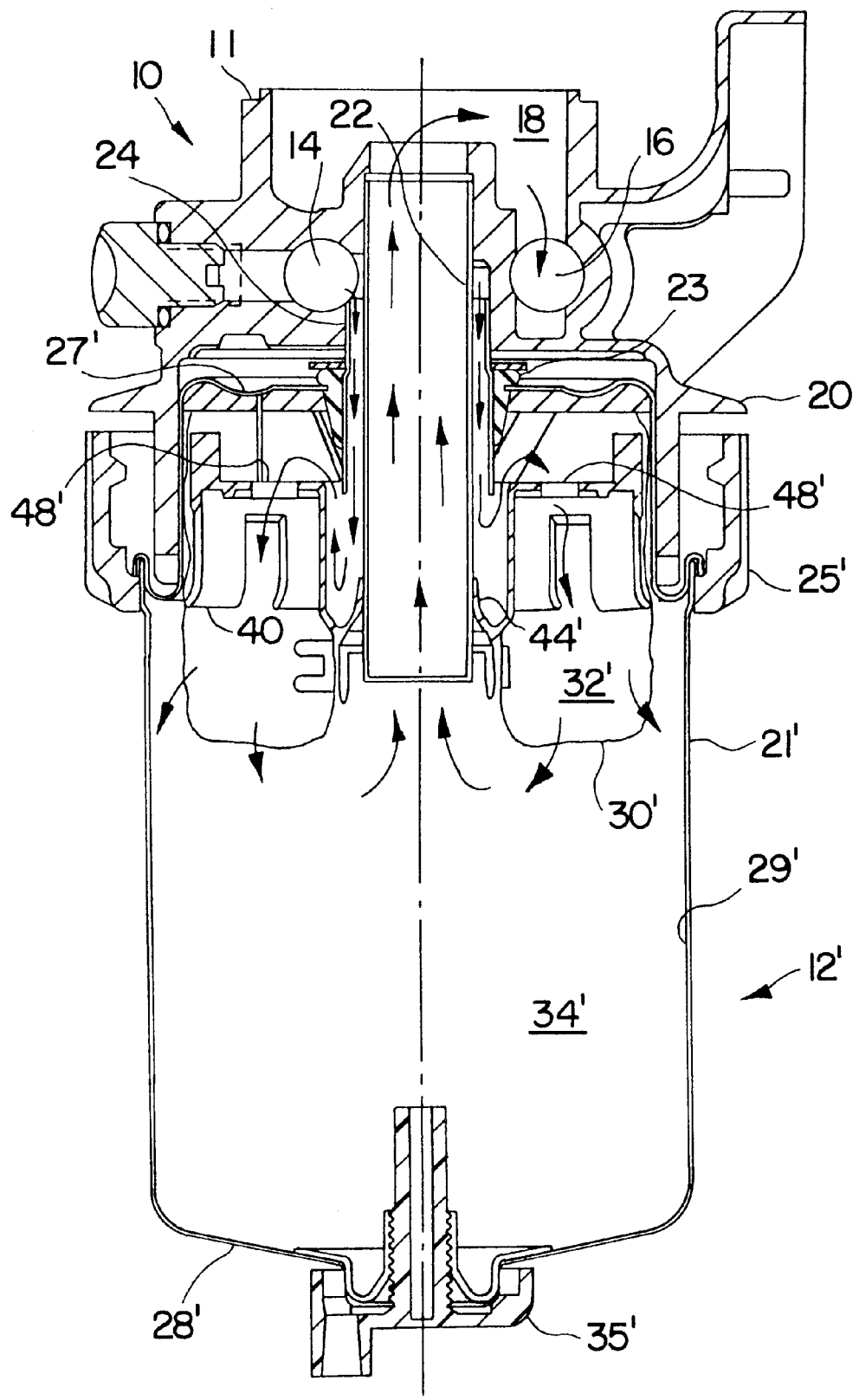
FIG. 3 is a cross-sectional elevation view of a filter cartridge in accordance with another embodiment of the present invention shown in combination with a header of the related art.

A second embodiment of the instant invention is depicted in FIG. 3. As indicated by the use of like reference numerals, the structure and operation of this embodiment is substantially similar to that described above with respect to the embodiment of FIG. 2 with the following primary exceptions. First, insert 40 ordinarily includes a plurality of dimples 48 disposed within plateau 46. In the embodiment of FIG. 3, dimples 48 have been punched through plateau 46 to form angularly spaced, fuel passage apertures 48' through plateau 46. Naturally, these fuel passage apertures are spaced radially inwardly from the perimeter of insert 40'. Second, those of ordinary skill will readily appreciate that filter element 30' comprises a sock filter disposed about insert 40'. The top of sock filter 30' is attached to hooks 59 of upstanding fins 50 shown in FIGS. 1a and 1b. The lower and opposite end of sock filter 30' is secured at the central region 42 of insert 40' using a clamp or other fastener as known in the art.

Fuel flow within the fuel filter assembly of FIG. 3 is similar to that described above with respect to the fuel filter assembly of FIG. 2 and is shown with arrows. As with the embodiment of FIG. 2, fuel is delivered to fuel exit port 14 of header 10 whereupon the fuel flows through second fuel conduit 24. Fuel exiting second conduit 24 travels into chamber 32' in the direction of axis A until reaching lip 44' whereupon the fuel reverses direction and is guided radially outwardly by insert 40' until encountering apertures 48'. The fuel then travels through the fuel passage apertures 48' in the direction of second end 28' of housing 21'. Upon passing through filter element 30', the fuel leaves first chamber 32' and enters second chamber 34' by travelling both outwardly toward side-wall 29' and axially in the direction of second end wall 28'. The fuel then travels radially inwardly until it is inward of the fuel passage defined between first and second fuel conduits 22 and 24. Thereafter, it travels axially toward the first end wall 27' of housing 21' until it traverses the length of first conduit 22. Finally, the fuel passes through reservoir 18 and exits header 10 via fuel entry port 16. Naturally, in addition to the fuel flow through apertures 48', some fuel flow outside the perimeter of insert 40', i.e., through fuel passages 57, is also possible in this embodiment.

Figure 4:
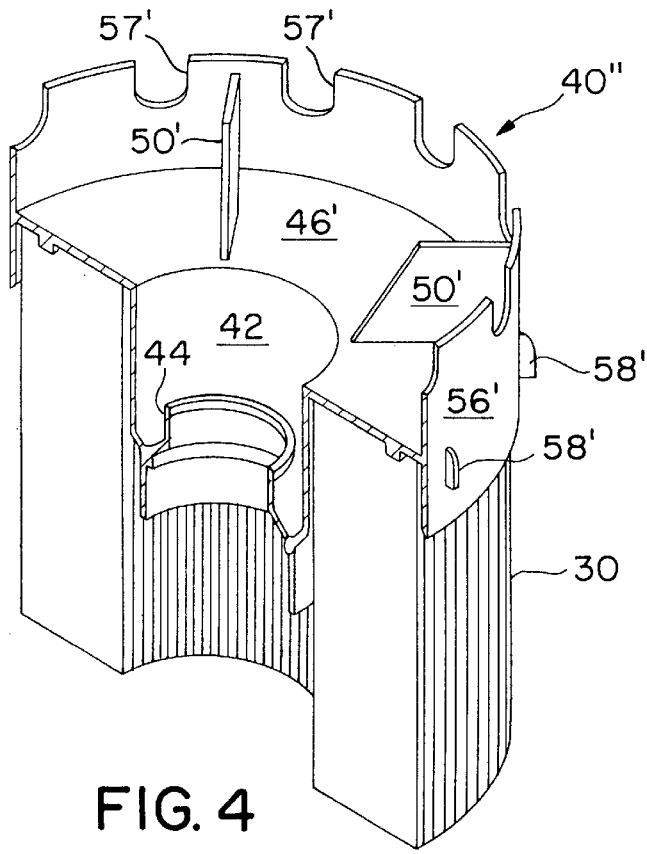
FIG. 4 is a perspective view of a section of an insert and filter element in accordance with another embodiment of the present invention.

Another embodiment of the insert of the present invention is shown in FIG. 4 in combination with the filter element 30 of FIG. 2. As indicated by the use of like reference numerals, the structure and operation of the FIG. 4 embodiment is substantially similar to that described above with respect to FIG. 2 with the following primary exceptions. First, insert 40" employs a notched skirt 56' which forms a generally cylindrical outer surface and extends both above and below plateau 46'. Also, skirt 56' defines notches 57' on the portion thereof extending above plateau 46'. Third, upstanding fins 50' extend into skirt 56' and are integrally formed therewith. Detents 58' centralize the insert and function to extend outwardly of the outer surface of skirt 56' such that, when insert 40" is received within a filter cartridge housing, a fuel flow passage is defined between the outer surface of skirt 56' and the housing. Finally, as shown in FIG. 4, plateau 46' may or may not employ dimples or removable portions, such as dimples 48 of the plateau 46 of FIG. 2.

Figure 5:
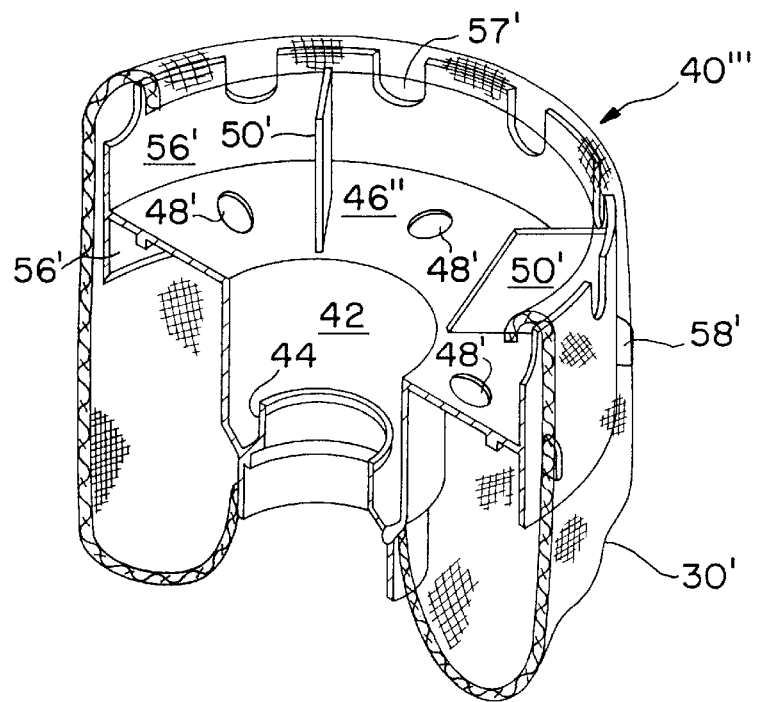
FIG. 5 is a perspective view of a section of an insert and filter element in accordance with still another embodiment of the present invention.

Another embodiment of the insert of the present invention is shown in combination with filter element 30' in FIG. 5. As shown therein, sock filter 30' is affixed to insert 40'" at one end at the upper edge of notched skirt 56' and at the other end around the bottom of central region 42. Insert 40'" is substantially similar to insert 40" except that plateau 46'" defines apertures 48' extending therethrough. Fuel flow through a filter cartridge employing insert 40'" is substantially similar to that in filter cartridge 12' of FIG. 3 as described above.

Many other variations of the present invention are possible. For example, the relative position, sizing and orientation of upstanding fins 50 and skirt 56 can be further varied as desired. Additionally, the size, position and configuration of dimples 48 can be further varied according to the fuel flow quantity and direction desired. Also, while some embodiments employ dimples 48 defining structurally weakened areas which can be punched out to define a plurality of apertures extending through plateau 46, it should be appreciated that inserts 40 and 40" need not employ such dimples since fuel flow in such embodiments is primarily around the perimeter of insert 40. Similarly, insert 40' of the FIG. 3 embodiment need not have structurally weakened dimples but may, instead, be manufactured with preformed apertures 48'. (See FIG. 5.) Naturally, and as noted above, the principles of the present invention discussed herein are also readily adaptable to a wide variety of other well-known and commonly used types of fluid filters.

While the present invention has been described in connection with what is presently considered to be the most practical and preferred embodiments, it is to be understood that the invention is not limited to the disclosed embodiments, but is intended to cover the various modifications and equivalent arrangements included within the spirit and scope of the appended claims.

What is claimed is:

1. A reverse-flow filter cartridge for filtering fuel passing therethrough, for use with a header of the type having a first port, a second port, central first conduit means for interiorly defining a first axial fuel passage communicable with the first port, second conduit means surrounding and cooperating with the first conduit means to define a second axial fuel passage therebetween, the second fuel passage communicating with said second port and base means for mounting said cartridge to the header, said cartridge comprising:

a housing having an axial opening and a seal which sealingly engages the exterior of the second conduit means when said cartridge is mounted to the base;

a filter element enclosed in said housing; and a flow-reversing insert enclosed in said housing between said opening and said filter element, said insert having an axial central region having a central sealing lip which defines an aperture therethrough, said lip sealingly engaging the first conduit of the header to prevent direct fluid communication between the first and second conduit means, said insert comprising a perimeter, a plateau, and a plurality of fins, said plateau extending from said central region toward said perimeter of said insert, and having a first surface disposed adjacent said filter element and an oppositely disposed second surface, said plurality of fins extending integrally from said second surface of said plateau, wherein each said fin is spaced apart from an adjacent said fin, said fins cooperating with said housing to define a plurality of fuel passages between said insert and said housing, said insert, said filter element and said housing cooperating to define a first chamber in communication with the first conduit means and to define a second chamber in communication with the second conduit means whereby, when said cartridge is mounted to the base, fuel delivered to the second port of the header progressively flows through the second conduit means, is guided radially outwardly by said insert, flows through said filter element, flows through said first conduit means and flows into the first port of the header.

2. The filter cartridge of claim 1, wherein said fuel passage means comprises a notched skirt traversing said perimeter of said insert, said fins and said skirt cooperating to define a plurality of fuel passages between said insert and said housing.

3. The filter cartridge of claim 2, wherein said plurality of fins comprises radially oriented fins axially extending from said plateau between said central region and said perimeter of said insert, wherein said seal further comprises a grommet seal disposed within said opening, and wherein said filter element is at least partially received between said notched skirt and said central region.

4. The filter cartridge of claim 2, wherein said housing further comprises a grommet disposed within said opening.

5. The filter cartridge of claim 2, wherein said plateau defines top and bottom surfaces and wherein said notched skirt only extends axially from one surface of said plateau.

6. The filter cartridge of claim 5, wherein said notched skirt includes a free end and a radially outward flare at said free end thereof.

7. The filter cartridge of claim 1, wherein said plateau further comprises a plurality of punch-out dimples defining structurally weakened areas, and wherein said dimples can be removed to define a plurality of apertures extending through said plateau.

8. The filter cartridge of claim 1, wherein said filter element comprises a filter element of continuous fan-shaped, pleated configuration symmetrically disposed about the first conduit axis and wherein said second chamber extends radially outwardly of said filter element.

9. A reverse-flow filter cartridge for filtering fuel passing therethrough, for use with a header of the type having a first port, a second port, central first conduit means for interiorly defining a first axial passage communicable with the first port, second conduit means surrounding and cooperating with the first conduit means to define a second axial fuel passage therebetween, the second fuel passage communicating with said second port and base means for mounting said cartridge to the header, said cartridge comprising:

a housing having an axial opening and a seal which sealingly engages the exterior of the second conduit means when said cartridge is mounted to the base, filter element enclosed in said housing;

a flow-reversing insert enclosed in said housing between said opening and said filter element, said insert having an axial central region having a central sealing lip which defines an aperture therethrough, a perimeter which mates with the housing, and a plateau extending from said central region toward said perimeter of said insert, wherein said central sealing lip sealingly engages said first conduit of said header and said plateau further comprises a plurality of punch-out dimples defining structurally weakened areas, and wherein said dimples can be removed to define a plurality of apertures extending through said plateau; and fuel passage means cooperating with said filter element and said housing to define at least one fuel passage located radially outwardly from said central region;

said filter element and said housing cooperating to define a first chamber in communication with the first conduit means and to define a second chamber in communication with the second conduit means whereby, when said cartridge is mounted to the base, fuel delivered to the second port of the header progressively flows through the second conduit means, is guided radially outwardly by said insert, flows through said filter element, flows through said first conduit means and flows into the first port of the header.

10. A reverse-flow filter cartridge for filtering fuel passing therethrough, for use with a header of the type having a first port, a second port, central first conduit means for interiorly defining a first axial passage communicable with the first port, second conduit means surrounding and cooperating with the first conduit means to define a second axial fuel passage therebetween, the second fuel passage communicating with said second port and base means for mounting said cartridge to the header, said cartridge comprising:

a housing having an axial opening coaxially surrounding a central axis and a seal which sealingly engages the exterior of the second conduit means when said cartridge is mounted to the base, filter element enclosed in said housing, said filter element having oppositely disposed first and second ends;

a flow-reversing insert enclosed in said housing between said opening and said filter element, said insert having a central region which sealingly engages the exterior of the first conduit and a perimeter which mates with the housing, and having a notched skirt traversing said perimeter of said insert, said notched skirt including a major portion that extends generally parallel to said central axis, wherein said major portion includes a plurality of notches defining a plurality of radial fuel passages disposed intermediate said first and second ends of said filter element;

said insert, said filter element and said housing cooperating to define a first chamber in communication with the first conduit means and to define a second chamber in communication with the second conduit means whereby, when said cartridge is mounted to the base, fuel delivered to the second port of the header progressively flows through the second conduit means, is guided radially outwardly by said insert, flows through said filter element, flows through said first conduit means and flows into the first port of the header.

* * * * *